(12) United States Patent
Pan et al.

(10) Patent No.: US 10,440,136 B2
(45) Date of Patent: Oct. 8, 2019

(54) METHOD AND SYSTEM FOR RESOURCE SCHEDULING

(71) Applicant: Alibaba Group Holding Limited, Grand Cayman (KY)

(72) Inventors: Lei Pan, Hangzhou (CN); Lin Yang, Hangzhou (CN); Liangliang Mao, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 344 days.

(21) Appl. No.: 15/231,812

(22) Filed: Aug. 9, 2016

(65) Prior Publication Data

US 2017/0048163 A1 Feb. 16, 2017

(30) Foreign Application Priority Data

Aug. 13, 2015 (CN) .......................... 2015 1 0494855

(51) Int. Cl.
*H04L 29/08* (2006.01)
*G06F 15/173* (2006.01)
*G06F 9/46* (2006.01)
*G06F 9/50* (2006.01)

(52) U.S. Cl.
CPC ............... *H04L 67/28* (2013.01); *G06F 9/46* (2013.01); *G06F 9/505* (2013.01); *H04L 67/1029* (2013.01); *H04L 67/1031* (2013.01); *H04L 67/325* (2013.01); *G06F 2209/548* (2013.01); *H04L 67/2871* (2013.01)

(58) Field of Classification Search
None
See application file for complete search history.

(56) References Cited

U.S. PATENT DOCUMENTS

| | | | |
|---|---|---|---|
| 7,502,859 B2 | 3/2009 | Inoue et al. | |
| 8,078,483 B1 * | 12/2011 | Hirose | G06Q 10/02 705/1.1 |
| 8,078,708 B1 | 12/2011 | Wang et al. | |
| 8,341,257 B1 | 12/2012 | Wang et al. | |
| 8,347,302 B1 | 1/2013 | Vincent et al. | |
| 8,787,154 B1 | 7/2014 | Medved et al. | |
| 8,898,274 B2 | 11/2014 | Wang et al. | |

(Continued)

OTHER PUBLICATIONS

International Search Report and Written Opinion to corresponding International Application No. PCT/US2016/046447 dated Oct. 26, 2016.

(Continued)

*Primary Examiner* — Natisha D Cox
(74) *Attorney, Agent, or Firm* — James J. DeCarlo; Greenberg Traurig, LLP

(57) ABSTRACT

An apparatus and method for resource scheduling on an application system utilizing a proxy server, the application system including one or more hosts and running one or more applications, each of the one or more applications having one or more instances. The method includes monitoring a request queue of application requests, at the proxy server, to be processed by the application system for the one or more applications, and scheduling computing resources of the application system for an application of the one or more applications according to a predetermined scheduling rule and a status of the request queue.

20 Claims, 3 Drawing Sheets

(56) References Cited

U.S. PATENT DOCUMENTS

| | | | |
|---|---|---|---|
| 8,918,784 | B1 | 12/2014 | Jorgensen et al. |
| 9,135,581 | B1 | 9/2015 | Beckford |
| 9,184,989 | B2 | 11/2015 | Wang et al. |
| 2003/0069917 | A1 | 4/2003 | Miller |
| 2003/0135458 | A1 | 7/2003 | Tadano et al. |
| 2006/0277305 | A1* | 12/2006 | Bernardin .............. G06Q 10/06 709/226 |
| 2007/0061464 | A1 | 3/2007 | Feng et al. |
| 2007/0244818 | A1 | 10/2007 | Tsuji et al. |
| 2011/0022812 | A1* | 1/2011 | van der Linden .... G06F 9/5077 711/163 |
| 2011/0078303 | A1* | 3/2011 | Li ........................... G06F 9/505 709/224 |
| 2012/0166010 | A1 | 6/2012 | Chou et al. |
| 2012/0331152 | A1 | 12/2012 | Tatsubori |
| 2013/0247034 | A1* | 9/2013 | Messerli ............. G06F 9/45533 718/1 |
| 2014/0137182 | A1* | 5/2014 | Elzur ...................... H04L 63/20 726/1 |
| 2014/0250436 | A1 | 9/2014 | Tang et al. |
| 2015/0178116 | A1 | 6/2015 | Jorgensen et al. |
| 2015/0215173 | A1 | 7/2015 | Dutta et al. |

OTHER PUBLICATIONS

International Preliminary Report on Patentability to corresponding International Application No. PCT/US2016/046447 dated Feb. 22, 2018 (9 pages).

Extended European Search Report dated Feb. 19, 2019 to corresponding EP Application No. 16835874.5 (9 pages).

* cited by examiner

METHOD AND SYSTEM FOR RESOURCE SCHEDULING

CROSS-REFERENCE TO RELATED APPLICATIONS

This application claims the benefit of priority from Chinese Patent Application No. 201510494855.9, filed on Aug. 13, 2015, entitled "Method and System for Resource Distribution," which is incorporated herein by reference in its entirety.

BACKGROUND

Field of the Disclosure

The present disclosure relates to the art of computer applications running on systems such as servers, and in particular, to a method and a system for resource scheduling.

Description of Related Art

A common problem in the operation of an application system is an occasional occurrence of a high number of hits, or requests. In order to ensure that the application system can operate normally, a server is generally built in accordance with a highest expected demand. However, in this case, the result will be a large amount of idle resources under normal operating conditions. If a peak number of hits is underestimated during the system construction period, the application system will become slow, or crash when a large number of concurrent requests arise. Accordingly, a flexible scheduling mechanism has been proposed to address the problem mentioned above, that is, when there is a high number of hits, computing resources will be created automatically to expand the processing capacity of the system, and when there is a low number of hits and the system is idle, computing resources will be reduced automatically to save costs.

A conventional flexible scheduling mechanism determines the load of applications based primarily on a utilization of system resources, for example, on the utilization of resources such as CPU, memory, network flow, magnetic disk IO, and the like. If utilization of the CPU or memory by an application is high, then it is determined that an expansion is required for the application. However, in certain cases, this approach fails to reflect the true status of utilization. For example, the system resources utilized by some applications may not be much, but the processing of such applications is extremely slow or even suspended. For such applications, the use of the current flexible scheduling mechanism is not able to satisfy the requirement for expansion.

BRIEF SUMMARY

According to some embodiments, the present disclosure provides methods and systems for resource scheduling which more accurately determine and satisfy the actual needs of scheduling.

According to some embodiments, the present disclosure provides a method for resource scheduling including monitoring a blocking status of application requests to be processed by a server and scheduling computing resources of the server for the application according to a predetermined scheduling rule and the blocking status of the application requests.

According to some embodiments of the present disclosure, the monitoring of a blocking status of application requests to be processed by a server includes collecting the number of requests in a queue of blocked requests in the server, the queue of blocked requests comprising the application requests to be processed by the server, and performing analyses and statistical analyses on the number of requests collected to obtain the blocking status of the application requests.

According to some embodiments of the present disclosure, the blocking status of the application requests includes at least one of a blocking status of requests with respect to a particular application, a blocking status of requests with respect to a particular instance, and a blocking status of requests with respect to a particular host.

According to some embodiments of the present disclosure, the collecting the number of requests in a queue of blocked requests in the server includes collecting the number of requests in the queue of blocked requests in the server from an exposed API of a proxy server.

According to some embodiments of the present disclosure, the method further includes providing an event monitoring and statistics module in the proxy server, wherein the event monitoring and statistics module monitors to the events of the proxy server submitting requests to the server to acquire a number of submitted requests; monitors to the events of the proxy server confirming that the server has completed processing of requests to acquire a number of processed requests, and determines a number of requests in the queue of blocked requests in the server according to the number of the submitted requests and the number of the processed requests.

According to some embodiments of the present disclosure, the collecting the number of requests in the queue of blocked requests in the server from an exposed API of a proxy server includes accessing the URL provided by the API, and acquiring, from the page data corresponding to the URL, the number of requests in the queue of blocked requests in the server.

According to some embodiments of the present disclosure, the scheduling the computing resources of the server for the application according to a predetermined scheduling rule and the blocking status of the application requests includes at least one of the following: if the blocking status of requests with respect to a particular application satisfies a first expansion condition, generating and deploying new instances for the particular application; if the blocking status of requests with respect to a particular application satisfies a first contraction condition, reducing instances for the particular application; if the blocking status of requests with respect to a particular instance satisfies a second expansion condition, increasing the system resources for the particular instance, or using other instances to share the load of the particular instance; if the blocking status of requests with respect to a particular instance satisfies a second contraction condition, reducing the system resources for the particular instance; if the blocking status of requests with respect to a particular host satisfies a third expansion condition, using other hosts to share the load of the particular host; and if the blocking status of requests with respect to a particular host satisfies a third contraction condition, preferentially deploying instances on the particular host, or preferentially using the particular host to share the load of other hosts.

According to some embodiments of the present disclosure, the method further includes at least one of the following: monitoring the resource utilization by the instances in the particular application, if the average resource utilization by the instances in a particular application is greater than or equal to a predetermined first upper limit value, increasing instances for the particular application; if the average resource utilization by the instances in a particular application is less than or equal to a predetermined first lower limit value, reducing instances for the particular application; monitoring the resource utilization by the instances in the particular application, if the resource utilization by an instance is greater than or equal to a predetermined second upper limit value, increasing the system resources utilized by the instance; if the resource utilization by an instance is less than or equal to a predetermined second lower limit value, reducing the system resources utilized by the instance; if a host is detected as unavailable, initiating a migration of the instances on the host; if a process is detected as unavailable, restarting the process, and if unsuccessful, initiating a migration of the instances on the process; and if an application exception is detected, restarting the application, or initiating a migration of the instances for the application, or generating an alert.

The present disclosure also provides a system for resource scheduling, including a block monitoring unit for monitoring a blocking status of application requests to be processed by a server; and a scheduling unit for scheduling computing resources of the server for the application according to a predetermined scheduling rule and the blocking status of the application requests.

In particular, according to some embodiments of the present disclosure, the block monitoring unit includes a monitoring subunit for collecting the number of requests in a queue of blocked requests in the server, the queue of blocked requests comprising the application requests to be processed by the server, and a computing subunit for performing analyses and statistical analyses on the number of requests collected by the monitoring subunit to obtain the blocking status of the application requests.

According to some embodiments of the present disclosure, the blocking status of the application requests includes at least one of the following: a blocking status of requests with respect to a particular application, a blocking status of requests with respect to a particular instance, and a blocking status of requests with respect to a particular host.

According to a preferred embodiment of the present disclosure, the monitoring subunit collects the number of requests in the queue of blocked requests in the server from an exposed API of a proxy server.

According to some embodiments of the present disclosure, the system further includes an event monitoring and statistics module provided in the proxy server configured to monitor to the events of the proxy server submitting requests to the server to acquire a number of submitted requests, monitor to the events of the proxy server confirming that the server has completed processing of requests to acquire a number of processed requests, and determine the number of requests in the queue of blocked requests in the server according to the number of the submitted requests and the number of the processed requests.

In particular, according to some embodiments of the present disclosure, the monitoring subunit is for accessing the URL provided by the API, and acquiring, from the page data corresponding to the URL, the number of requests in the queue of blocked requests in the server.

In particular, according to some embodiments of the present disclosure, the scheduling unit performs at least one of the following schedulings: if the blocking status of requests with respect to a particular application satisfies a first expansion condition, generating and deploying new instances for the particular application; if the blocking status of requests with respect to a particular application satisfies a first contraction condition, reducing instances for the particular application; if the blocking status of requests with respect to a particular instance satisfies a second expansion condition, increasing the system resources for the particular instance, or using other instances to share the load of the particular instance; if the blocking status of requests with respect to a particular instance satisfies a second contraction condition, reducing the system resources for the particular instance; if the blocking status of requests with respect to a particular host satisfies a third expansion condition, using other hosts to share the load of the particular host; and if the blocking status of requests with respect to a particular host satisfies a third contraction condition, preferentially deploying instances on the particular host, or preferentially using the particular host to share the load of other hosts.

According to some embodiments of the present disclosure, the block monitoring unit is further used for monitoring resource utilization by the instances in a particular application, and the scheduling unit is further configured for: increasing instances for the particular application if the average resource utilization by the instances in a particular application is greater than or equal to a predetermined first upper limit value, and reducing instances for the particular application if the average resource utilization by the instances in a particular application is less than or equal to a predetermined first lower limit value, or, increasing the system resources utilized by the instance if the resource utilization by an instance is greater than or equal to a predetermined second upper limit value, and reducing the system resources utilized by the instance if the resource utilization by an instance is less than or equal to a predetermined second lower limit value.

According to some embodiments some embodiments of the present disclosure, the system further includes a status detecting unit for detecting an operating status of a host, a process or an application; and the scheduling unit is further used for: initiating a migration of the instances on the host if a host is detected by the status detecting unit as unavailable; restarting a process if the process is detected by the status detecting unit as unavailable, and if unsuccessful, initiating a migration of the instances on the process; and restarting the application, or initiating a migration of the instances for the application, or generating an alert if an application exception is detected by the status detecting unit.

According to some embodiments of the present disclosure, the scheduling unit includes a scheduling subunit for generating a scheduling command based on a predetermined scheduling rule and the blocking status of the application requests, and sending the scheduling command to a managing subunit; and a managing subunit for performing, according to the scheduling command, scheduling of the computing resources of the server for the application.

As is evident from the descriptions and depictions herein, the present disclosure has adopted an approach whereby the blocking status of the application requests to be processed by a server is collected, and based on this, the computing resources of the server for the application are scheduled, instead of being based on utilization of the system resources by the application. Since the blocking status of application requests to be processed by the server can more truly reflect the load of the application, the way of scheduling according to the present disclosure can more accurately satisfy the actual needs of scheduling and improve the operation of computing resources and the overall system of which the processors are a part.

BRIEF DESCRIPTION OF THE DRAWINGS

The accompanying drawings described herein are intended, when taken together with the following detailed description, to provide further understanding of the present disclosure. The exemplary embodiments of the present disclosure and the description thereof are intended for further explaining and clarifying the present disclosure; the scope of the present disclosure is not defined by the description or the accompanying drawings of any specific embodiments, but rather by the claims. The present disclosure includes the following accompanying drawings.

DETAILED DESCRIPTION

In order to make the objectives, technical solutions, and advantages of the present disclosure more clear, the present disclosure will be described below in detail with reference to the accompanying drawings and the particular embodiments.

Figure 1:
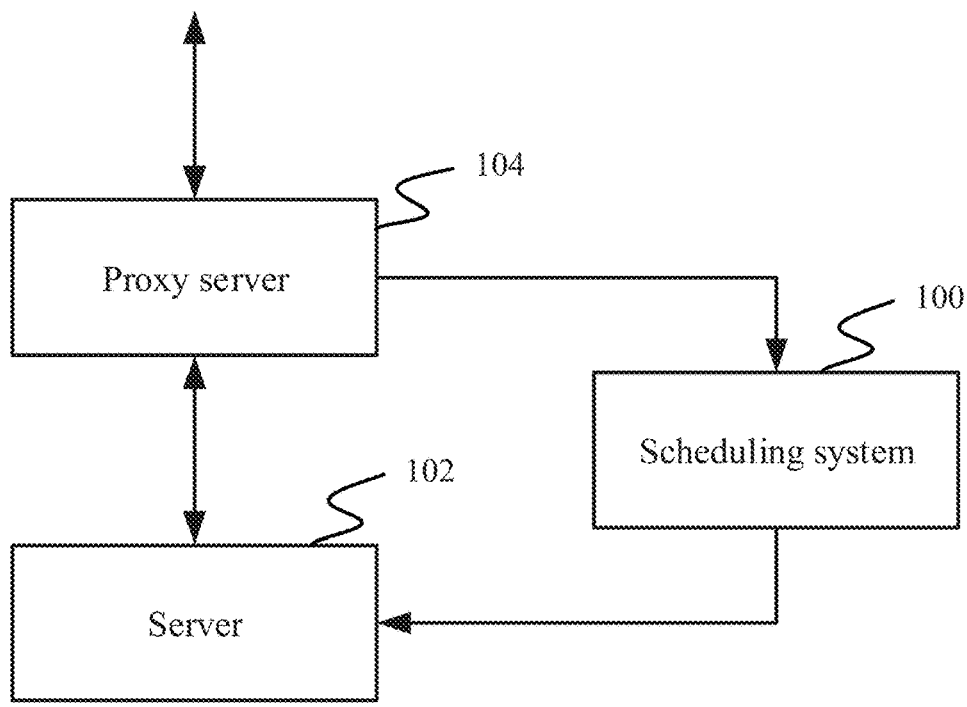
FIG. 1 is a non-limiting block diagram of an architecture according to some embodiments of the present disclosure.

To facilitate understanding of the present disclosure, first, the architecture on which the present disclosure is based upon will be discussed. As shown in FIG. 1, in the architecture, the server 102 is a network device for specifically processing application requests, that is, the access object of application requests is the server 102, which is responsible for processing each application request to realize the service content of the application. Additionally, the server 102 for processing application requests may be a single server, or a cluster of servers including multiple machines.

In the server 102, at least one host may exist, with each host having one or more application instances running thereon. That is, an application can be comprised of more than one application instance, with each application instance being deployed on a host. The application instances may be deployed on the same host, or on different hosts, or even on different servers of a cluster of servers.

In the architecture shown in FIG. 1, the proxy server 104 is responsible for forwarding the application requests from user-side devices to the server for processing, and forwarding the responses from the server to the user-side devices.

The scheduling system 100 is the core of the present disclosure, which is responsible for monitoring the blocking status of the application requests to be processed by the server 102, and performing scheduling of the computing resources of the server for the applications according to a predetermined scheduling rule and the blocking status of the application requests. More particularly, when monitoring the blocking status of the application requests to be processed by the server 102, the scheduling system does not acquire the blocking status directly from the server, but instead indirectly obtains the blocking status of the application requests to be processed by the server 102 by collecting data from the proxy server 104 and then analyzing the same. The processing steps and the components of the scheduling system will be described below in detail.

Figure 2:
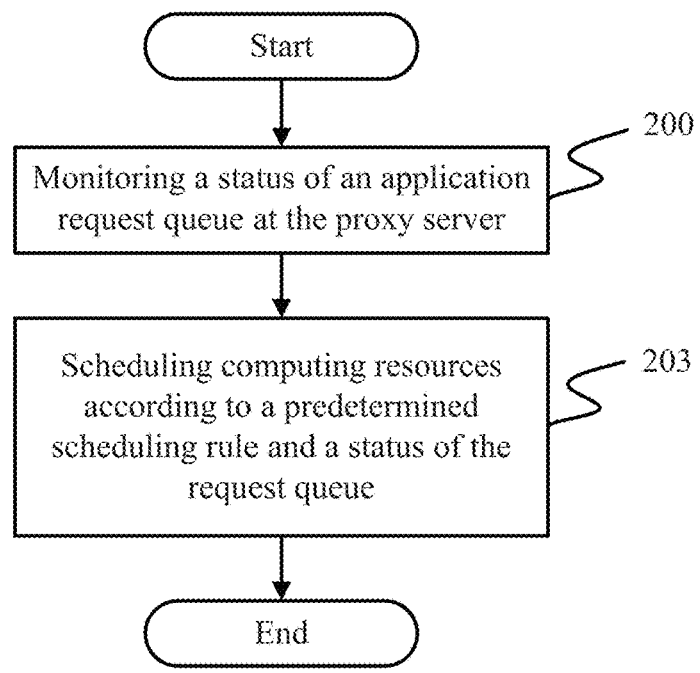
FIG. 2 is a schematic flow diagram of a method according to some embodiments of the present disclosure.

FIG. 2 is a schematic flow diagram of a method according to some embodiments of the present disclosure.

According to some embodiments, the present disclosure provides a method for resource scheduling. Step 200 is monitoring a request queue of application requests, at the proxy server, to be processed by the application system for the one or more applications. Step 203 is scheduling computing resources of the application system for an application of the one or more applications according to a predetermined scheduling rule and a status of the request queue.

Figure 3:
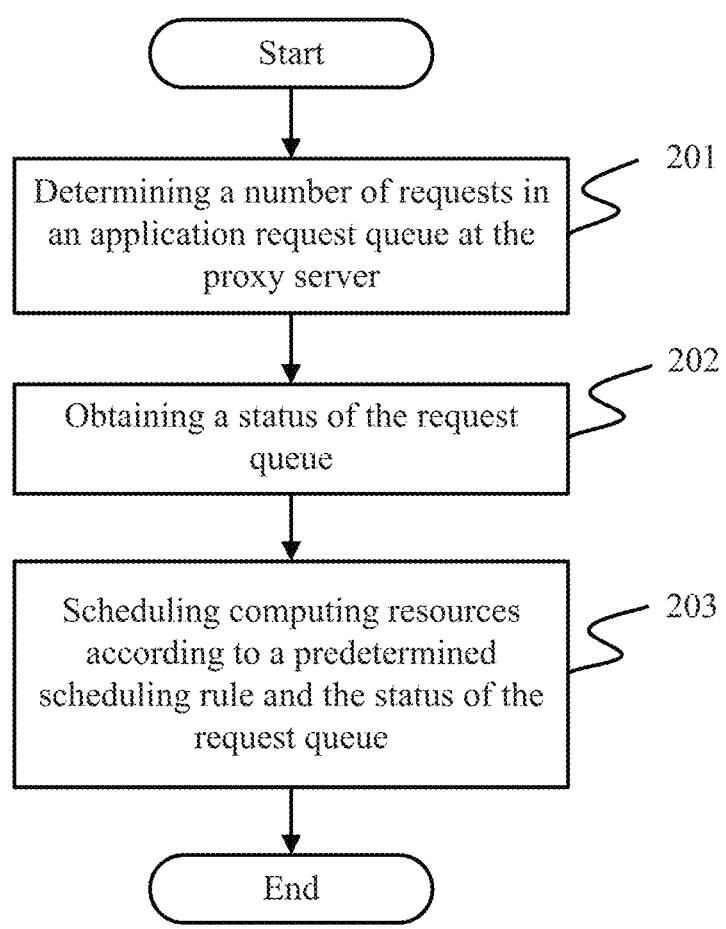
FIG. 3 is a schematic flow diagram of a method according to some embodiments of the present disclosure.

FIG. 3 is a schematic flow diagram of the method according to some embodiments of the present disclosure, which can be performed by the scheduling system described above, for example. As shown in FIG. 3, the method includes the following steps.

Step 201 is collecting the number of requests in a queue of blocked requests in the server from an exposed API (Application Programming Interface) of the proxy server.

Since the proxy server is responsible for forwarding the application requests to the server and receiving responses returned from the server after the server processes the application requests, the number of the requests sent to the server to be processed by the server can be known by the number of the application requests that have been forwarded by the proxy server to the server and the number of the requests that correspond to the responses received by the proxy server from the server. Based on this process, the collection of the number of requests in the queue of blocked requests in the server can be obtained via the proxy server.

More particularly, since the proxy server follows an asynchronous event processing mechanism, a corresponding event will be present when processing is performed. Therefore, an event monitoring and statistics module can be provided in the proxy server in advance, the event monitoring and statistics module being responsible for the proxy server's monitoring of events and statistics of requests. That is, the event monitoring and statistics module monitors to the events of the proxy server representing requests to the server, to acquire the number of the requests that have been submitted. Here, a global variable can be used to represent the number of the requests that have been submitted, with the value of 1 being added to the global variable (assuming for example the variable is identified as u) for each request having been submitted. Additionally, the event monitoring and statistics module monitors to the events of that the proxy server confirming that the server has completed processing of requests (for example, receives responses returned from the server after the server processes the application requests), to acquire the number of the processed requests. For each response received that a request has been processed, the value of 1 will be subtracted from the global variable u mentioned above. The final value of the global variable may be considered as the number of requests in the queue of blocked requests in the server, i.e., the number of requests that have been sent to the server to be processed by the server.

In some embodiments, the event monitoring and statistics module can also monitor to the events that the proxy server establishes network connections for, but which have not yet been forwarded to the server, in order to acquire the number of requests for which network connections have been established. The number of requests indicates the processing load that the server will face, and can serve as an assisting factor which the scheduling unit can use as a reference in subsequent scheduling of computing resources.

The number of requests acquired as above can be output by the event monitoring and statistics module through an exposed API of the proxy server, wherein the HTTP protocol, for example, may be employed for output. For example, the API can provide a particular URL, and when the scheduling system accesses the URL, the API will return a page which can provide the number of requests described above in the form of formatted data, that is, the scheduling system acquires, from the page data corresponding to the URL, the number of requests in the queue of blocked requests in the server.

Step 202 is performing analyses and statistical analyses on the number of requests collected to obtain the blocking status of the application requests.

In this step, numerical analyses and statistical analyses on the number of requests collected can be performed to determine the number of requests in the queue of blocked requests corresponding to each particular application, the number of requests in the queue of blocked requests corresponding to each particular instance, and the number of requests in the queue of blocked requests corresponding to a particular host. For a request, the particular application to which it corresponds can be determined according to the domain name it accesses, the particular host to which it corresponds can be determined according to the IP address it accesses, and the particular instance to which it corresponds can be determined according to the port it accesses.

The number of requests in the queue of blocked requests in combination with the processing capacity of the corresponding computing resources can reflect the blocking status of the requests, which will be apparent in the description herein below.

Step 203 is scheduling the computing resources of the server for the application according to a predetermined scheduling rule and the blocking status of the application requests.

For a particular application, if the blocking status of the requests with respect to the application satisfies a first expansion condition, for example, the number of requests in the queue of blocked requests exceeds 3 times the processing capacity of the computing resources utilized by the application (here "3 times" is merely exemplary, and in practice, an empirical value or a value derived from historical data may be used; the same applies to the examples provided below), then it is indicated that the blocking of the requests with respect to the application is critical, and new instances need to be generated and deployed for the application. The deployment of the new instances may be based on a load balancing strategy, with the new instances being preferentially deployed on hosts having a relatively lower load (for example, having a relatively smaller number of requests in the queue of blocked requests). If the blocking status of the requests with respect to the application satisfies a first contraction condition, for example, the number of requests in the queue of blocked requests is less than 0.5 times the processing capacity of the computing resources utilized by the application, then it is indicated that the number of requests with respect to the application is small, and the computing resources it occupies are idle. Thus, instances assigned to the application can be reduced. In particular, no requests can be assigned to an instance to be terminated, and the instance can be terminated when it has no tasks.

For a particular instance, if the blocking status of the requests with respect to the instance satisfies a second expansion condition, for example, the number of requests with respect to the instance in the queue of blocked requests exceeds 3 times the processing capacity of the computing resources utilized by the instance, then it is indicated that the blocking of the requests with respect to the instance is critical, and system resources can be increased for the instance. System resources associated with the present disclosure may include, but are not limited to, a CPU, a memory, an IO resource, a network flow, and the like. In some embodiments, instances can be added to share the load of the instance. Further, in some embodiments, based on the utilization of the system resources by the instance, it can be determined which type of system resources should be added.

If the blocking status of the requests with respect to the instance satisfies a second contraction condition, for example, the number of requests with respect to the instance in the queue of blocked requests is less than a fractional amount, for example 0.50 or less of the processing capacity of the computing resources utilized by the instance, then it is indicated that the computing resources it occupies are idle, and thus the computing resources for the instance can be reduced.

For a particular host, if the blocking status of the requests with respect to the particular host satisfies a third expansion condition, for example, the number of the requests with respect to the host in the queue of blocked requests exceeds 3 times the processing capacity of the host, then additional hosts may be used to share the load of the host. If the blocking status of the requests with respect to the particular host satisfies a third contraction condition, for example, the number of requests with respect to the host in the queue of blocked requests is less than 0.5 times the processing capacity of the host, then new instances may preferentially be deployed on the host, or, the host may preferentially be used to share the load with other hosts.

The above-described scheduling of computing resources can be performed periodically to satisfy the needs for flexible scheduling for applications in different stages.

On this basis, currently used flexible scheduling mechanisms can also be incorporated, which may, for example, include, but are not limited to, the following.

In some embodiments, resource utilization by the instances in a particular application is monitored, including such system resources as a CPU, a memory, or an IO resource. If the average resource utilization by all instances is greater than or equal to a predetermined first upper limit value, for example, greater than or equal to 80% of the theoretical average value, then instances can be increased for the particular application. If the average resource utilization by all instances is less than or equal to a predetermined first lower limit value, for example, less than or equal to 20% of the theoretical average value, then instances can be reduced for the particular application. Here, the first upper limit value is greater than the first lower limit value.

In some embodiments, if the resource utilization by an instance is greater than or equal to a predetermined second upper limit value, for example, the CPU occupied is greater than 30%, then the system resources, such as a CPU, a memory, or an IO resource utilized by the instance can be increased. If the resource utilization by an instance is less than or equal to a predetermined second lower limit value, for example, the CPU occupied is less than 10%, then the system resources utilized by the instance can be decreased. Here, the second upper limit value is greater than the second lower limit value.

If a host is detected as unavailable, then a migration, for example, to another host or a plurality of other hosts, of all of the instances on the host can be initiated. When migrated to another host or a plurality of other hosts, the instances can, according to a load balancing strategy, be migrated to the host(s) with a relatively smaller load.

If a process is detected as unavailable, then a restart of the process can be performed. If the restart is unsuccessful, then a migration of the instances on the process can be initiated. The instances may be migrated to other processes, in particular, may be migrated to other processes on the same host, but in most circumstances they will be migrated to processes on other hosts.

If an application is detected as unavailable, which may be caused by failure of or attack on an application, then the process on which the instances of the application reside may be restarted, or the instances of the entire application may be migrated, or an alert may be generated.

In the embodiments described above, the resource utilization by each instance of an application can be restricted. By way of non-limiting example, an upper limit of memory utilization by each instance may be set at 4 GB. The resource utilization by each application may also be restricted. For example, an upper limit of total CPU utilization by all instances of the application may be set at 80%. The purpose of doing this is to prevent an unlimited use of system resources caused by some application code exceptions. Furthermore, the scheduling system can provide an interface, which can be used by a user to configure and adjust the above-described scheduling rule and the upper limits of resource utilization.

Figure 4:
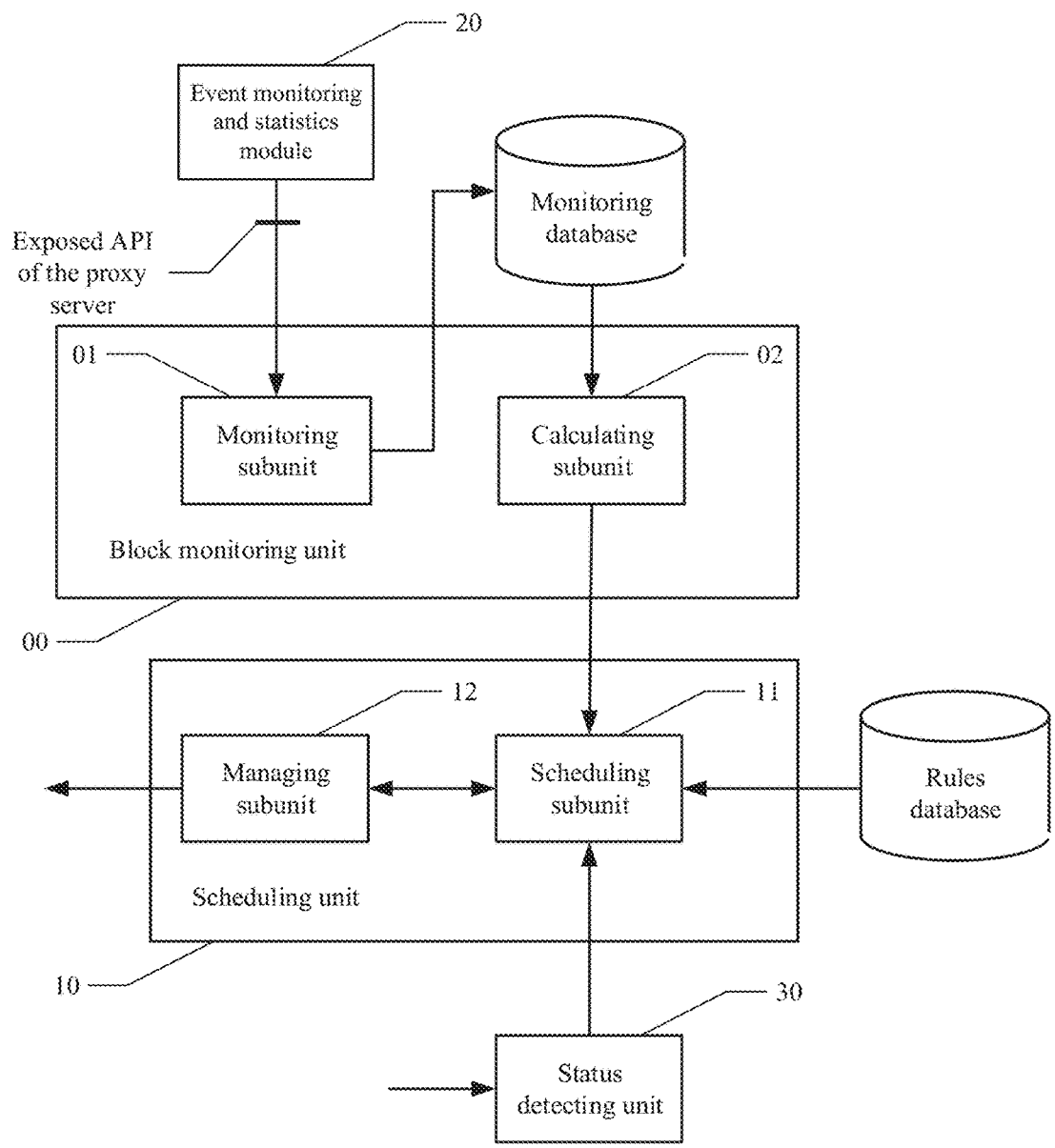
FIG. 4 is a block diagram of a system for resource scheduling according to some embodiments of the present disclosure.

FIG. 4 is a block diagram of a system for resource scheduling according to some embodiments of the present disclosure. As shown in FIG. 4, the system may include a block monitoring unit 00 and a scheduling unit 10, and may further include an event monitoring and statistics module 20 provided in a proxy server, and a status detecting unit 30. Here, the block monitoring unit 00 may include a monitoring subunit 01 and a calculating subunit 02. The scheduling unit 10 may include a scheduling subunit 11 and a managing subunit 12.

The block monitoring unit 00 is responsible for monitoring the blocking status of application requests to be processed by the server.

In particular, the monitoring subunit 01 is responsible for collecting the number of requests in the queue of blocked requests in the server, the queue of blocked requests including the application requests to be processed by the server. The monitoring subunit 01 can collect the number of requests in the queue of blocked requests in the server from an exposed API of the proxy server.

Since the proxy server follows an asynchronous event processing mechanism, a corresponding event will be present when processing is performed. Therefore, an event monitoring and statistics module 20 may be provided in the proxy server, which is responsible for monitoring to the events of the proxy server submitting requests to the server in order to acquire the number of the requests that have been submitted, monitoring to the events of the proxy server confirming that the server has completed processing requests in order to acquire the number of processed requests, and determining the number of requests in the queue of blocked requests in the server based on the number of the submitted requests and the number of the processed requests.

Here, a global variable may be used for statistics of the number of the requests that have been submitted, with the value of 1 being added to the global variable for each request having been submitted, and the value of 1 being subtracted from the global variable for each response received that a request has been processed. The final value of the global variable can be considered as the number of requests in the queue of blocked requests in the server, i.e., the number of requests that have been sent to the server to be processed by the server.

In addition, the event monitoring and statistics module 20 can also monitor to the events that the proxy server establishes network connections for, in order to acquire the number of requests for which network connections have been established, but which have not yet been forwarded to the server. This number of requests indicates the processing load that the server will face, and can serve as an assisting factor which the scheduling unit may use as a reference in subsequent scheduling of computing resources.

The number of requests acquired as above can be output by the event monitoring and statistics module 20 through the exposed API of the proxy server, wherein a communication protocol such as the HTTP protocol, for example, can be employed for the output. For example, the API may provide a particular URL, and when the scheduling system accesses the URL, the API will return a page which can provide the number of requests described above in the form of a formatted data. That is, the monitoring subunit 01 accesses the URL provided by the API, to acquire, from the page data corresponding to the URL, the number of requests in the queue of blocked requests in the server.

The computing subunit 02 is responsible for performing analyses and statistical analyses on the number of requests collected by the monitoring subunit 01 to obtain the blocking status of the application requests. Here, the blocking status of application requests includes at least one of following: a blocking status of requests with respect to a particular application, a blocking status of requests with respect to a particular instance, and a blocking status of requests with respect to a particular host. For a request, a particular application to which it corresponds can be determined according to the domain name it accesses, a particular host to which it corresponds can be determined according to the IP address it accesses, and a particular instance to which it corresponds can be determined according to the port it accesses.

Since collection of the number of requests by the monitoring subunit 01 is performed periodically, the monitoring subunit 01 can send the data collected to a monitoring database, and the computing subunit 02 performs the above-described analyses and statistical analyses on the data in the monitoring database.

The scheduling unit 10 is responsible for scheduling the computing resources of the server for the application according to a predetermined scheduling rule and the blocking status of the application requests.

In particular, the scheduling unit 10 may perform at least one of the following schedulings.

If the blocking status of requests with respect to a particular application satisfies a first expansion condition, then new instances for the particular application can be generated and deployed. The deployment of the new instances can be based on a load balancing strategy, with the new instances being preferentially deployed on hosts having a relatively lower load (for example, having a relatively smaller number of requests in the queue of blocked requests). If the blocking status of requests with respect to the particular application satisfies a first contraction condition, then instances can be reduced for the particular application, wherein no requests can be assigned to an instance to be terminated, and the instance can be terminated when it has no tasks.

If the blocking status of requests with respect to a particular instance satisfies a second expansion condition, then system resources can be increased for the particular instance, or other instances can be used to share the load of the particular instance. If the blocking status of requests with respect to the particular instance satisfies a second contraction condition, then system resources can be reduced for the particular instance.

If the blocking status of requests with respect to a particular host satisfies a third expansion condition, then other hosts can be used to share the load of the particular host. If the blocking status of requests with respect to the particular host satisfies a third contraction condition, then instances can preferentially be deployed on the particular host, or the particular host can preferentially be used to share the load of other hosts.

On this basis, currently used flexible scheduling mechanisms can also be incorporated into the system. In such case, the block monitoring unit 00 is also responsible for monitoring the resource utilization by the instances for a particular application. If the average resource utilization by the instances for a particular application is greater than or equal to a predetermined first upper limit value, then the scheduling unit 10 can increase instances for the particular application. If the average resource utilization by the instances for a particular application is less than or equal to a predetermined first lower limit value, then the scheduling unit 10 can decrease instances for the particular application. Here, the first upper limit value is greater than the first lower limit value.

If the resource utilization by an instance is greater than or equal to a predetermined second upper limit value, then the scheduling unit 10 can increase the system resources utilized by the instance, such as a CPU, a memory, or an IO resource. If the resource utilization by an instance is less than or equal to a predetermined second lower limit value, then the scheduling unit 10 can decrease the system resources utilized by the instance. Here, the second upper limit value is greater than the second lower limit value.

The status detecting unit 30 is responsible for detecting an operating status of a host, a process or an application. If a host is detected by the status detecting unit 30 as unavailable, then a migration, for example, to another host or a plurality of other hosts, of the instances on the host can be initiated by the scheduling unit 10. In some embodiments, when migrated to another host or a plurality of other hosts, the instances can, according to a load balancing strategy, preferentially be migrated to the host(s) with a relatively smaller load.

If a process is detected by the status detecting unit 30 as unavailable, then a restart of the process can be performed by the scheduling unit 10. If the restart is unsuccessful, then a migration of the instances on the process can be initiated. The instances can be migrated to other processes, in particular, they can be migrated to other processes on the same host, but in some embodiments it is preferred that they are migrated to processes on other hosts.

If the status detecting unit 30 detects an application exception, then the scheduling unit 10 can restart the application, or initiate a migration of the instances for the application, or generate an alert.

The scheduling subunit 11 included in the scheduling unit 10 is responsible for generating a scheduling command based on a predetermined scheduling rule and the blocking status of the application requests, and sending the scheduling command to the managing subunit 12. In some embodiments, the scheduling subunit 11 can load the scheduling rule from a rules database. The database can be provided with an interface through which a user can configure or change the scheduling rule.

The managing subunit 12 is the unit specifically for performing scheduling operations. The managing subunit 12 is normally responsible for management of resources, and in the embodiments of the present disclosure, it is responsible for scheduling the computing resources in the server for applications according to scheduling commands. Further, the result of scheduling can be returned to the scheduling subunit 11.

For the purposes of this disclosure a module and unit is a software, hardware, or firmware (or combinations thereof) system, process or functionality, or component thereof, that performs or facilitates the processes, features, and/or functions described herein (with or without human interaction or augmentation). A module can include sub-modules, and a unit can comprise a sub-unit. Software components of a module/unit can be stored on a computer readable medium for execution by a processor. Modules/units can be integral to one or more servers or devices, or be loaded and executed by one or more servers/devices. One or more modules can be grouped into an engine or an application.

It should be understood that the system and method disclosed in the embodiments provided by the present disclosure may be implemented in other ways. As such, the embodiments described above are merely exemplary. For example, the partitioning of the units is merely in a logical and functional sense, and other ways of partitioning may be possible in practical implementation.

The units that are described as individual components may or may not be physically separated, and the components shown as units may or may not be physical units, that is, they may be located in one place, or distributed on multiple network units. Depending on actual needs, part or all of the units may be selected for achieving the objectives of the embodiments.

Additionally, the individual functional units in each embodiment of the present disclosure may be integrated into one processing unit, or may exist in a physically separated manner, or two or more units may be integrated into one unit. The integrated unit described above may be implemented in the form of hardware, or in the form of hardware in combination with software functional units.

The integrated unit implemented in the form of software functional units can be stored in a computer readable storage medium. The software functional units are stored in a storage medium, and comprise a number of commands enabling a computing device (which may be a personal computer, a server, or a network device, or the like) or a processor to perform part of the steps of the method described in each embodiment of the present disclosure. The storage medium mentioned above includes tangible media such as for example: a USB flash disk, a mobile hard disk, a read-only memory (ROM), a random access memory (RAM), a magnetic disk, or a compact disk, or various other mediums which can store program codes in tangible form as opposed to pure signals.

The embodiments described above are merely preferred embodiments of the present disclosure, and are not intended to limit the same. Any modifications, equivalent substitutions and improvements to these embodiments without departing from the spirit and principle of the present disclosure are deemed to be encompassed within the scope of the present disclosure.

The invention claimed is:

1. A method for resource scheduling, the method comprising:
monitoring at a proxy server, by a scheduling system, a request queue of application requests on an application system utilizing the proxy server, the application system including one or more hosts and running one or more applications to be processed by the application system, each of the one or more applications having one or more instances;

determining, by the scheduling system, a status of the request queue, the status of the request queue including one or more blocked requests issued by the proxy server to the one or more hosts; and scheduling, by the scheduling system, computing resources of the application system for an application of the one or more applications according to a predetermined scheduling rule and the status of the request queue.

2. The method according to claim 1, the monitoring the request queue comprising:

determining, from the request queue, a number of application requests; and performing a statistical analysis, based on the number of application requests, to obtain the status of the request queue.

3. The method according to claim 2, wherein the number of the application requests comprises at least one of requests chosen from a group of requests consisting of a number of the application requests corresponding to each application of the one or more applications, a number of the application requests corresponding to each instance of the one or more instances of each of the one or more applications running on the one or more hosts, and a number of the application requests corresponding to each host of the one or more hosts.

4. The method according to claim 2, the determining the number of the application requests comprising:

determining the number of the application requests in the request queue via an exposed Application Programming Interface (API) of the proxy server.

5. The method according to claim 4, wherein a number of submitted requests and a number of processed requests is received from the proxy server via the API, and wherein the determining the number of the application requests in the request queue is determining a difference between the number of the submitted requests and the number of the processed requests.

6. The method according to claim 4, the determining the number of the application requests comprising:

accessing a Uniform Resource Locator (URL) provided by the API; and acquiring, from page data corresponding to the URL, the number of the application requests in the request queue.

7. The method according to claim 3, the scheduling the computing resources of the application system for the application comprising at least one of:

generating new instances, for each application of the one or more applications, when a status of the request queue corresponding to the application satisfies a first expansion condition, and reducing instances, for each application of the one or more applications, when the status of the request queue corresponding to the application satisfies a first contraction condition;

increasing the computing resources, for each instance of the one or more instances of each of the one or more applications, when a status of the request queue corresponding to the instance satisfies a second expansion condition, and reducing the computing resources, for each instance of the one or more instances of each of the one or more applications, when the status of the request queue corresponding to the respective instance satisfies a second contraction condition; and using, for each host of the one or more hosts, other hosts of the one or more hosts to share a load of the host when a status of the request queue corresponding to the host satisfies a third expansion condition, and using, for each host of the one or more hosts, the host to share a load of other hosts of the one or more hosts when the status of the request queue corresponding to the host satisfies a third contraction condition, wherein an expansion condition is a predetermined condition indicating a high utilization of the computing resources of the application system, and wherein a contraction condition is a predetermined condition indicating a low utilization of the computing resources of the application system.

8. The method according to claim 2, the scheduling the computing resources of the application system for the application comprising at least one of:

increasing, for each application of the one or more applications, a number of instances of the application when an average resource utilization of all instances of the one or more instances of the application is greater than or equal to a predetermined first upper limit, and decreasing the number of instances of the application when the average resource utilization is less than or equal to a predetermined first lower limit; and increasing, for each instance of the one or more instances of each of the one or more applications, computing resources of the instance when a maximum resource utilization of the instance is greater than or equal to a predetermined second upper limit, and decreasing, for each instance of the one or more instances of each of the one or more applications, the computing resources of the instance when the maximum resource utilization of the instance is less than or equal to a predetermined second lower limit.

9. A scheduling system for resource scheduling, the apparatus comprising:

one or more processors; and a non-transitory computer-readable memory storing instructions executable by the one or more processors, the instructions causing the scheduling system to:

monitor, at a proxy server, a request queue of application requests on an application system utilizing the proxy server, the application system including one or more hosts and running one or more applications to be processed by the application system, each of the one or more applications having one or more instances;

determining, by the scheduling system, a status of the request queue, the status of the request queue including one or more blocked requests issued by the proxy server to the one or more hosts; and schedule computing resources of the application system for an application of the one or more applications according to a predetermined scheduling rule and the status of the request queue.

10. The apparatus according to claim 9, wherein the instruction to monitor further causes the scheduling system to:

determine, from the request queue, a number of application requests; and perform a statistical analysis, based on the number of application requests, to obtain the status of the request queue.

11. The apparatus according to claim 10, wherein the number of the application requests comprises at least one of a number of the application requests corresponding to each application of the one or more applications, a number of the application requests corresponding to each instance of the one or more instances of each of the one or more applications running on the one or more hosts, and a number of the application requests corresponding to each host of the one or more hosts.

12. The apparatus according to claim 10, wherein the instruction to monitor further causes the scheduling system to determine the number of the application requests in the request queue via an exposed Application Programming Interface (API) of the proxy server.

13. The apparatus according to claim 12,
wherein a number of submitted requests and a number of processed requests is received from the proxy server via the API, and
wherein the number of the application requests in the request queue is determined as a difference between the number of the submitted requests and the number of the processed requests.

14. The apparatus according to claim 12, wherein the instruction to monitor further causes the scheduling system to:
access a Uniform Resource Locator (URL) provided by the API; and
acquire, from page data corresponding to the URL, the number of the application requests in the request queue.

15. The system according to claim 11, wherein the scheduling circuitry is further configured to at least one of:
generate new instances, for each application of the one or more applications, when a status of the request queue corresponding to the application satisfies a first expansion condition, and reduce instances, for each application of the one or more applications, when the status of the request queue corresponding to the application satisfies a first contraction condition;
increase the computing resources, for each instance of the one or more instances of each of the one or more applications, when a status of the request queue corresponding to the instance satisfies a second expansion condition, and reduce the computing resources, for each instance of the one or more instances of each of the one or more applications, when the status of the request queue corresponding to the respective instance satisfies a second contraction condition; and
use, for each host of the one or more hosts, other hosts of the one or more hosts to share a load of the host when a status of the request queue corresponding to the host satisfies a third expansion condition, and use, for each host of the one or more hosts, the host to share a load of other hosts of the one or more hosts when the status of the request queue corresponding to the host satisfies a third contraction condition,
wherein an expansion condition is a predetermined condition indicating a high utilization of the computing resources of the application system, and
wherein a contraction condition is a predetermined condition indicating a low utilization of the computing resources of the application system.

16. The system according to claim 11, wherein the scheduling circuitry is further configured to at least one of:
increase, for each application of the one or more applications, a number of instances of the application when an average resource utilization of all instances of the one or more instances of the application is greater than or equal to a predetermined first upper limit, and decrease the number of instances of the application when the average resource utilization is less than or equal to a predetermined first lower limit; and
increase, for each instance of the one or more instances of each of the one or more applications, computing resources of the instance when a maximum resource utilization of the instance is greater than or equal to a predetermined second upper limit, and decrease, for each instance of the one or more instances of each of the one or more applications, the computing resources of the instance when the maximum resource utilization of the instance is less than or equal to a predetermined second lower limit.

17. A non-transitory computer-readable storage medium tangibly encoded with computer-executable instructions, that when executed by a processor, cause the processor to perform a method for resource scheduling, the method comprising:
determining, from a request queue of application requests at a proxy server to be processed by an application system for one or more applications, a number of application requests;
performing a statistical analysis, based on the number of application requests, to obtain a status of the request queue;
determining, by the scheduling system, a status of the request queue, the status of the request queue including one or more blocked requests issued by the proxy server to the one or more hosts; and
scheduling computing resources of the application system for an application of the one or more applications according to a predetermined scheduling rule and the status of the request queue.

18. The non-transitory computer-readable storage medium according to claim 17, wherein the number of the application requests comprises at least one of a number of the application requests corresponding to each application of the one or more applications, a number of the application requests corresponding to each instance of the one or more instances of each of the one or more applications running on the one or more hosts, and a number of the application requests corresponding to each host of the one or more hosts.

19. The non-transitory computer-readable storage medium according to claim 18, the scheduling the computing resources of the application system for the application comprising at least one of:
generating new instances, for each application of the one or more applications, when a status of the request queue corresponding to the application satisfies a first expansion condition, and reducing instances, for each application of the one or more applications, when the status of the request queue corresponding to the application satisfies a first contraction condition;
increasing the computing resources, for each instance of the one or more instances of each of the one or more applications, when a status of the request queue corresponding to the instance satisfies a second expansion condition, and reducing the computing resources, for each instance of the one or more instances of each of the one or more applications, when the status of the request queue corresponding to the respective instance satisfies a second contraction condition; and
using, for each host of the one or more hosts, other hosts of the one or more hosts to share a load of the host when a status of the request queue corresponding to the host satisfies a third expansion condition, and using, for each host of the one or more hosts, the host to share a load of other hosts of the one or more hosts when the status of the request queue corresponding to the host satisfies a third contraction condition, wherein an expansion condition is a predetermined condition indicating a high utilization of the computing resources of the application system, and wherein a contraction condition is a predetermined condition indicating a low utilization of the computing resources of the application system.

20. The non-transitory computer-readable storage medium according to claim 18, the scheduling the computing resources of the application system for the application comprising at least one of:

increasing, for each application of the one or more applications, a number of instances of the application when an average resource utilization of all instances of the one or more instances of the application is greater than or equal to a predetermined first upper limit, and decreasing the number of instances of the application when the average resource utilization is less than or equal to a predetermined first lower limit; and increasing, for each instance of the one or more instances of each of the one or more applications, computing resources of the instance when a maximum resource utilization of the instance is greater than or equal to a predetermined second upper limit, and decreasing, for each instance of the one or more instances of each of the one or more applications, the computing resources of the instance when the maximum resource utilization of the instance is less than or equal to a predetermined second lower limit.

\* \* \* \* \*